United States Patent [19]  [11] 4,184,690
Brown  [45] Jan. 22, 1980

[54] ANNULAR ELEMENTS

[75] Inventor: John E. Brown, Mansfield Woodhouse, England

[73] Assignee: West & Son (Engineers) Limited, England

[21] Appl. No.: 872,174

[22] Filed: Jan. 25, 1978

[30] Foreign Application Priority Data

Jan. 25, 1977 [GB] United Kingdom ............... 2924/77
May 27, 1977 [GB] United Kingdom ............. 22627/77
Nov. 5, 1977 [GB] United Kingdom ............. 46121/77

[51] Int. Cl.² ......................................... F16J 15/18
[52] U.S. Cl. ................................. 277/102; 277/206 R
[58] Field of Search ............... 277/206, 117, 75, 102, 277/116.8, 118

[56] References Cited

U.S. PATENT DOCUMENTS

| 2,321,927 | 6/1943 | McCoy et al. | 277/75 |
| 3,044,786 | 7/1962 | Chillson | 277/75 |
| 3,083,023 | 3/1963 | Creavey | 277/206 |
| 3,227,462 | 1/1966 | Tamplen | 277/102 |
| 3,785,659 | 1/1974 | Maurer | 277/75 |
| 3,926,442 | 12/1975 | Müller | 277/75 |
| 4,002,345 | 1/1977 | Jankowiak et al. | 277/110 |

Primary Examiner—Robert I. Smith
Attorney, Agent, or Firm—Paul & Paul

[57] ABSTRACT

There is disclosed a seal formed by a seal housing having an annular chamber, a shaft extending therethrough and an annular sealing element disposed within the chamber and partitioning it into a plurality of annular spaces, the sealing element being rigid but compressible and engaging the wall of the chamber radially spaced from the shaft as well as the shaft and said sealing element being provided with fluid passages such that when compressive forces are placed upon the element, the fluid pressure on all sides of said element are equalized.

5 Claims, 4 Drawing Figures

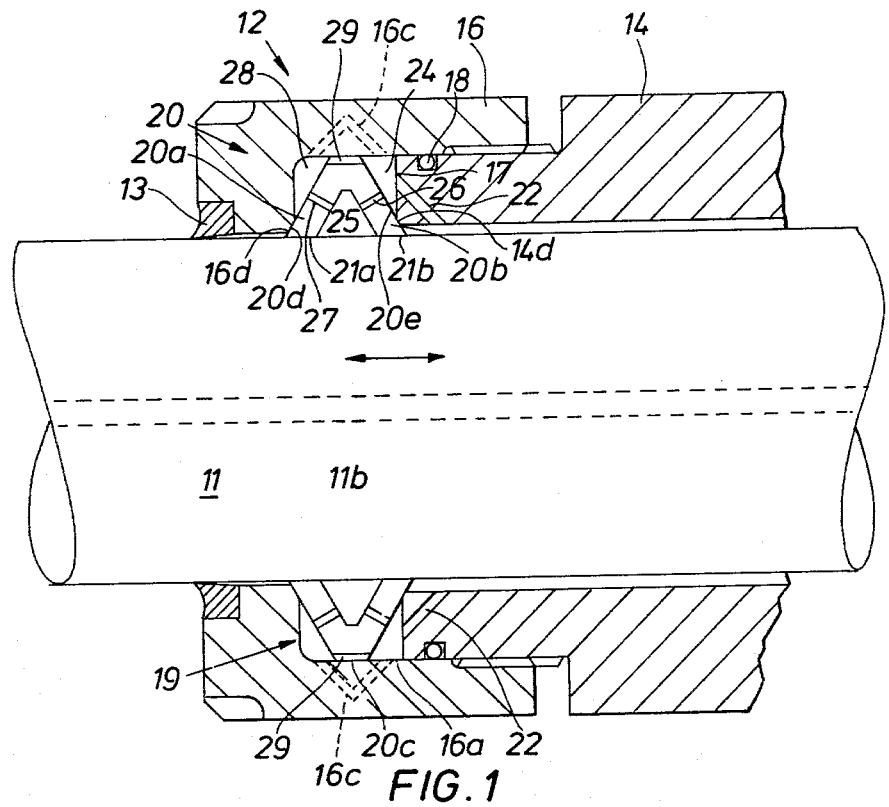
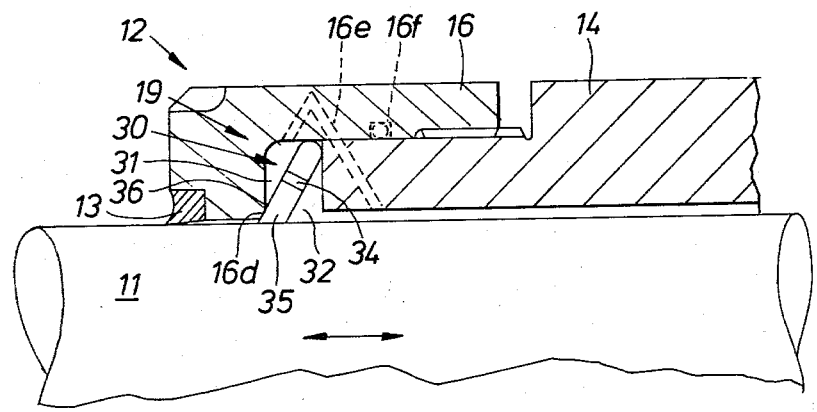

ANNULAR ELEMENTS

The present invention relates to seals for use with rotating and/or reciprocating shafts.

U.K. Pat. Nos. 834,075 and 1,126,898 disclose examples of annular seals used for providing a seal between a shaft and a casing and these seals are of the kind which expand radially on the application of an axial loading. In theory this type of seal ought to provide a good seal and possess the advantage of being adjustable to accommodate for wear by increasing the axial loading.

Unfortunately, however, in practice it has been found that this type of seal quickly deteriorates particularly when the seal is exposed to high fluid pressure conditions and/or has to seal against a rapidly moving shaft.

According to one aspect of the present invention there is provided an annular sealing element, the cross-sectional shape of which is such that upon axial compression its outer and/or its inner periphery is caused to move radially outwards or inwards respectively, the element having fluid ducts arranged to conduct fluid passed the walls of the seal.

Preferably the sealing element includes a lip formation extending about its outer and/or inner periphery, the or each lip formation being deflectable outwards or inwards respectively.

The or each lip formation may be defined by a line of weakness extending about the periphery of the seal. The line of weakness may be in the form of a groove or series of closely spaced recesses.

In one embodiment, the annular element has a wall which, in cross-section, is flat, the wall being inclined to the axis of the element. The angle of inclination is chosen to suit the application to which the annular element is to serve. The included angle between the axis and the wall of the annular element is normally chosen to be at least 45°. However, it is appreciated that the angle may be less in some cases.

In another embodiment the annular element has a wall which in cross-section is cranked to form a generally "V" shape or is curved. The wall of the element may be cranked or curved in either the radial or axial directions.

The inner and/or outer periphery of the annular element may be rounded or flat as desired.

The choice of material and of the thickness of material used is such that the annular element is flexible enough to permit it to be flexed without fracture to a condition whereat it is substantially planar on application of said axial compression. Particularly when the annular elements are to be used for a journal bearing the material and thickness should be so chosen that the element is rigid enough to transmit the axial compression loading into a radial loading applied through its outer and inner peripheries without the wall undergoing a deformation resulting in a transfiguration of shape.

The material may conveniently have surfaces exhibiting low co-efficients of friction for instance, a suitable plastics material which may be impregnated with a lubricant, for example, a molybdenum disulphide filled Nylon 66 as supplied by Polypenco Limited under the Registered Trade Mark NYLATRON GS. Another example of a suitable material is FLUOROSINT (Registered Trade Mark) which is a ceramic-like polytetrafluoroethlylene based material which has a higher temperature working range than the NYLATRON GS.

The annular elements may, if desired, be made from metals or metal alloys. If necessary a lubricant such as oil may be applied to the annular elements during use to reduce frictional wear.

According to another aspect of the present invention, there is provided, in combination, a seal housing, having an annular chamber a shaft extending through the annular chamber of the seal housing and at least one annular sealing element located in the annular chamber and partitioning the annular chamber into a plurality of annular spaces and serving to provide a seal between the shaft and the seal housing, the cross-sectional shape of the sealing element being such that upon axial compression its outer and/or its inner periphery is caused to move radially outwards or inwards respectively, the housing and/or shaft having fluid ducts arranged to conduct fluid to at least some of the annular spaces.

Preferably the fluid ducts are arranged to provide fluid communication into all the annular spaces so that equal fluid pressure is applied to both sides of each wall of the element.

It will be appreciated that the fluid ducts may be provided in both the sealing element and the seal housing and/or shaft.

Additionally, it will also be appreciated that the fluid supplied to the sealing element may originate from a source which is located internally and/or externally in relation to the sealing element.

Thus for instance, if the seal element is used in a centrifugal pump which is intended to pump fluid containing particulate material e.g. a slurry, then clean fluid may be fed from an external source to the sealing element thus reducing the possibility of the fluid ducts becoming blocked. The fluid after being fed to the seal element may then be fed to the interior of the pump to mix with the slurry.

Reference is now made to the accompanying drawings, in which:

FIG. 1 is an axial section through a shaft and seal housing and illustrates a first embodiment according to the present invention.

FIG. 2 is a similar view to FIG. 1 showing a second embodiment according to the present invention.

Figure 3:
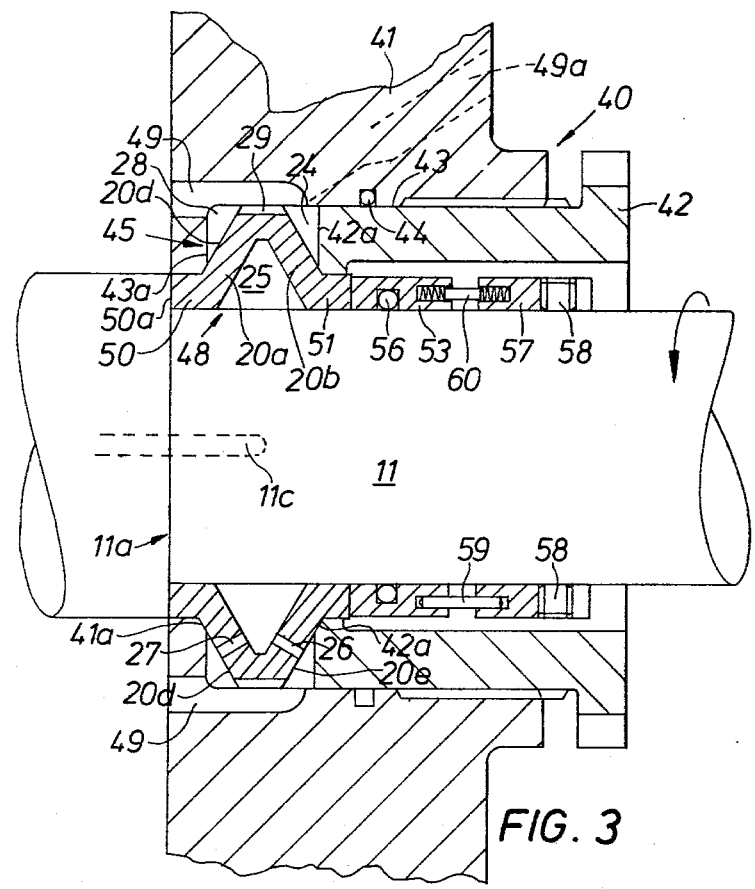
FIG. 3 is a similar view to FIG. 1 showing a third embodiment according to the present invention.

In FIG. 1 there is shown a shaft 11 passing through a seal housing 12. In the particular embodiment of FIG. 1 the seal housing 12 is defined in part by the cylinder 14 of a hydraulic ram and in part by an end cap 16 which is threadedly received on the end of cylinder 14. An O-ring 18 is provided between the cap 16 and cylinder 14 to prevent leakage of fluid which is contained within the cylinder 14. The cap 16 is provided with a scraper ring 13 formed of a suitable material, for instance a plastics material.

The cap 16 and the end face 17 of cylinder 14 define therebetween an annular chamber or channel 19 in which an annular sealing element 20 is seated. The sealing element 20 is "V" shaped in cross-section and is arranged so that the respective end faces 21a, 21b, of each leg 20a, 20b is in engagement with the shaft 11 and the outer peripheral face 20c is in engagement with the inner face 16a of cap 16.

Outer face 20d of leg 20a is in sealing abutment with a seal defined by inclined face 16d of cap 16 and outer face 20e of leg 20b is in sealing abutment with a seat defined by inclined face 14d of cylinder 14. If desired, the abutment between face 14d and face 14e need not necessarily be of a sealing nature.

It will be apparant therefore that upon rotation of cap 16 the seal element 20 may be placed under axial compression with the result of causing deflection of legs 20a, 20b.

As indicated above, cylinder 14 contains hydraulic fluid and this is fed via fluid ducts 22 into the annular space 24 defined between leg 20b and the end face 17 of cylinder 14. It will be appreciated that fluid communication between annular space 24 and the cylinder 14 may be achieved, alternatively or additionally, by the provision of fluid ducts in the form of radially extending channels (not shown) formed in face 20e.

The seal element 20 is additionally provided with fluid ducts 26 in the form of bores which provide fluid communication between annular space 24 and the enclosed annular space 25 defined between legs 20a, 20b. Fluid ducts 27 in the form of bores are also provided to provide fluid communication between annular space 28 and annular space 25.

Additionally, axially extending fluid ducts 29 in the form of channels are provided about the periphery of face 20c to provide direct fluid communication between annular spaces 24 and 28. Thus fluid is fed to each annular space 24, 25 and 28 so that fluid pressure applied on each side of each leg 20a, 20b is equal and opposite. Consequently, the effective axial compression applied to seal element 20 is that applied through the agency of cap 16 and cylinder 14. It follows therefore that the fluid pressure cannot act to deform the seal element and so sealing abutment between face 20d and face 16d and between 21a and the shaft 11 is ensured irrespective of the fluid pressure.

Consequently, the above seal element 20 is in a state of "fluid pressure balance" and is particularly suited for use in applications where high fluid pressures are involved.

In the embodiment of FIG. 1 it will be appreciated that the condition of "fluid pressure balance" may be also achieved by omitting either fluid ducts 29 or by retaining fluid ducts 29 and omitting either fluid ducts 26 or fluid ducts 27.

In certain situations, for instance where the seal element is exposed to low fluid pressures i.e. fluid pressures which are not sufficient to cause excessive deformation of the seal element, it is possible to omit both fluid ducts 26 and fluid ducts 27 so that fluid is not supplied to annular space 25 but only to annular spaces 24 and 28.

A further embodiment is illustrated in FIG. 2 in which similar parts to those illustrated in FIG. 1 are designated by similar reference numbers. In FIG. 2, the annular seal element 30 contained within the annular channel 19 is generally frusto conical in shape and divided channel 19 into two annular spaces 31, 32 respectively. Seal element 30 is provided with a plurality of circumferentially spaced fluid ducts 34 in the form of bores which permit fluid communication between the annular spaces 31, 32. Consequently fluid pressure either side of the seal element 30 is equal and opposite and thus seal element 30 is also in a condition of "fluid pressure balance".

The inner peripheral face 35 of seal element 30 sealingly engages the shaft 11 and its outer face 36 sealingly abuts face 16 of cap 16. It will be appreciated that seal element 30 may be axially compressed by rotation of cap 16 on cylinder 14.

Figure 4:
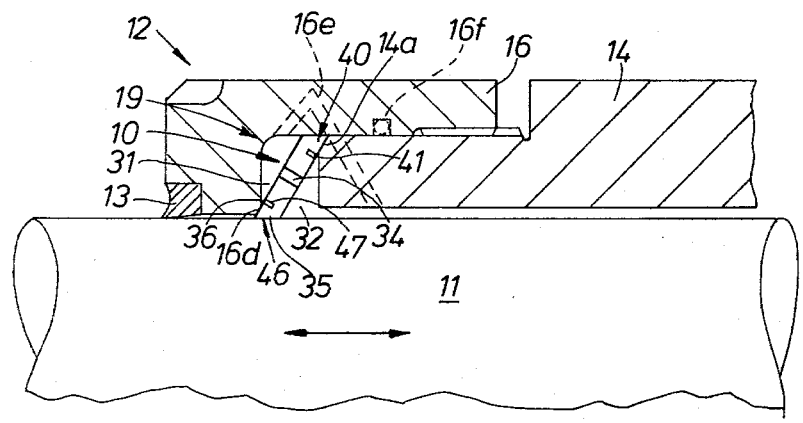
FIG. 4 is a similar view to FIG. 1 showing a fourth embodiment according to the present invention.

The seal 10 shown in FIG. 4 is similar in construction to the seal illustrated in FIG. 2 and consequently similar parts have been denoted by similar reference numerals.

Seal 10 is provided with a lip formation 40 which is formed by providing the seal with an annular groove 41. The depth of the groove 41 is preferably chosen to be about half the thickness of the seal.

The groove 41 is spaced from the outer peripheral surface of the seal by distance sufficient to provide a sealing face 14a formed on the cylinder 14.

The groove 41 is therefore exposed to the fluid to be sealed located in space 32 and as a consequence fluid pressure applied to the outermost side wall of the groove tends to urge the lip formation outwards against the inner wall of channel 19. This therefore supplements the radial forces produced by axial compression of the seal and increases in value as the fluid pressure increases.

If desired, a similar lip formation 46 may be provided at the inner periphery of the seal by provision of groove 47. Groove 47 is located so as to be in communication with annular space 31.

As indicated above, the embodiments of FIGS. 1, 2, and 4 are particularly suited for use in sealing axially reciprocating shafts but it is to be appreciated that those embodiments may also be used for sealing of rotating shafts.

In FIG. 3 another embodiment is illustrated which is particularly suited for use in sealing rotating shafts and for illustration purposes the seal is shown in use in a centrifugal pump.

In FIG. 3, the seal housing 40 is defined in parts by a portion of the casing 41 of the centrifugal pump and in part by a sleeve 41 which is threadedly received within a bore 43 of the casing 41. An O-ring 44 is provided between the casing 41 and sleeve 42 to prevent leakage of fluid therebetween.

An annular channel 45 is defined between an end face 42a of sleeve 42 and an end wall 43a of bore 43. An annular sealing element 48 is located within the annular channel 45.

Sealing element 48 is basically of the same construction as the sealing element 20 and according like parts are denoted by similar reference numerals. Sealing element 48 is provided with two annular flanges 50, 51 which extend axially in opposite directions from legs 20a, 20b respectively.

Flange 50, which may be omitted if desired, has an end face 50a which sealingly abuts against a step 11a formed in shaft 11. Outer face 20d abuts inclined annular face 41a formed in the end wall 43a and outer faced 20e sealingly abuts inclined annular face 42a formed in the sleeve 42. Consequently the sealing element 48 may be placed under axial compression by rotation of sleeve 42.

The flange 51 extends into the sleeve 42 to abut against a sealing ring 53. The abutting faces of sealing ring 53 and flange 51 co-operate to define a fluid tight abutment. An O-ring 56 is provided between ring 53 and shaft 11 to prevent fluid leakage therebetween. The ring 53 is axially movable relative to shaft 11 but is prevented from rotating relative thereto by virtue of an anchorage ring 57 which is secured to shaft 11 by means of grub screws 58. Rings 53 and 57 are connected via a plurality of axially extending pins 59 spaced about the circumference of the shaft 11 so that rings 53 and 57 rotate in unison with shaft 11. A plurality of springs 60 are also provided to bias ring 53 into abutment with flange 51.

The sealing element 48 is also provided with fluid ducts 26, 27 and 29 to provide fluid communication between annular spaces 24, 25 and 28. Again for low pressure applications fluid ducts 26 and 27 may be omitted.

In use fluid is supplied to the annular channel 45 by means of fluid channels 49 which communicate with the interior of the pump. If desired fluid may be supplied from an external source via a fluid channel 49a indicated in broken lines in FIG. 3.

It will be appreciated that the embodiment of FIG. 3 may be modified by adopting a sealing element which is generally frusto conical in shape as would be achieved if leg 20a and flange 50 were removed from sealing element 48.

It is to be appreciated that fluid may be conducted to the enclosed annular spaces by the provision of suitable fluid ducts in either the seal housing or the shaft. These fluid ducts may supplement or replace the fluid ducts formed in the sealing element.

Thus in FIG. 1, fluid may be conducted to annular space 25 via a channel 11b (shown in broken lines) formed in the surface of shaft 11. The provision of channel 11b would necessitate the provision of a suitable projection on leg 20a for sealing engagement within the channel. Fluid may be conducted to annular space 28 via fluid ducts 16c formed in the cap 16.

In FIGS. 2 and 4, fluid may be conducted to annular space 28 via fluid ducts 16e. In such a case, an O-ring 16f would be provided to prevent fluid leakage between cap 16 and cylinder 14. In FIG. 3 fluid channels 49 provide fluid communication to annular spaces 28 and 24 and fluid may be conducted to annular space 25 via a channel 11c formed in the surace of shaft 11.

It will be appreciated therefore that annular sealing elements not having fluid ducts such as those disclosed in U.K. Pat. Nos. 834,075 and 1,126,898 may be used in applications where the necessary fluid ducts are provided in the seal housing and/or shaft.

What we claim is:

1. In combination, a seal housing, having an annular chamber, a shaft extending through the annular chamber of the seal housing and at least one annular sealing element located in the annular chamber and partitioning the annular chamber into a plurality of annular spaces and serving to provide a seal between the shaft and the seal housing, the annular chamber being defined by an axially extending wall surface radially spaced from the shaft and axially spaced abutment surfaces, a first of said abutment surfaces being located on the air side of the seal element and the second of said abutment surfaces located on the fluid side of the seal element, the abutment surfaces being movable relative to one another to axially compress the seal element, the sealing element having a wall portion protruding in opposite axial directions and being provided with an inner peripheral surface for sealing engagement with the shaft and an outer peripheral surface for abutment against the axially extending wall surface of the chamber, the wall portion having a marginal side surface portion adjacent to and extending about the inner peripheral surface and which sealingly abuts against the first abutment surface, the wall portion being made of a rigid material, and fluid passages being provided in the wall portion, seal housing and/or the shaft for providing fluid communication within the housing between said annular spaces to equalize fluid pressure either side of the wall portion.

2. The combination according to claim 1 wherein the wall portion is provided with an annular groove formed in the wall portion adjacent to said marginal side surface portion so as to define a lip formation.

3. The combination according to claim 2 wherein the seal element has an additional wall portion extending from the outer peripheral surface to engage the shaft, fluid passages being provided for equalizing fluid pressure on either side of the additional wall portion.

4. The combination according to claim 2 wherein the seal element is formed from a molybdenum disulphide filled polyamide.

5. The combination according to claim 3 wherein the seal element is formed from a molybdenum disulphide filled polyamide.

* * * * *